No. 778,912. PATENTED JAN. 3, 1905.
W. STÖCKIGT.
DRY CELL.
APPLICATION FILED MAY 12, 1904.
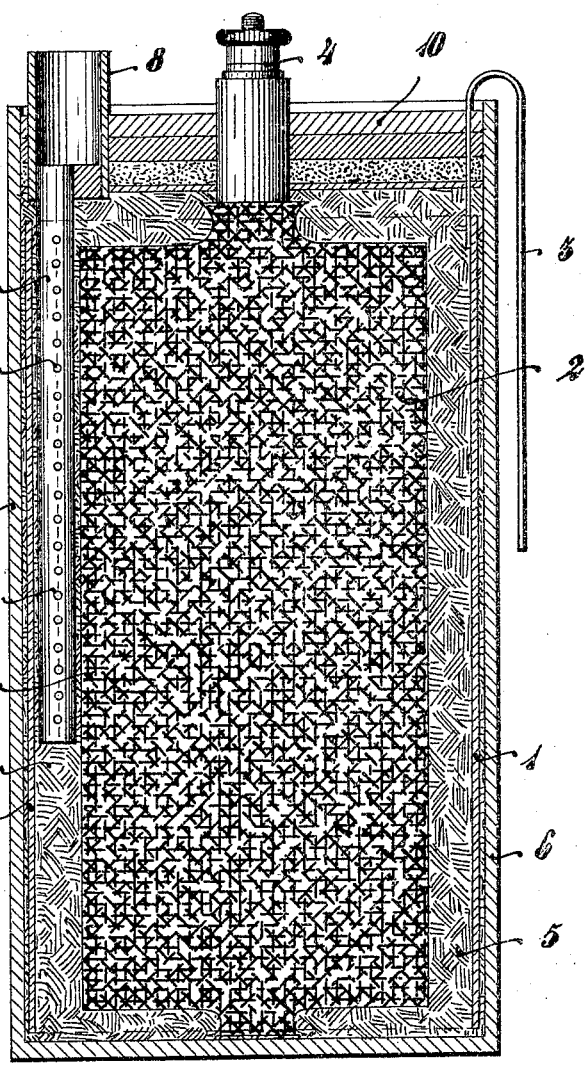
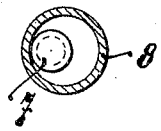
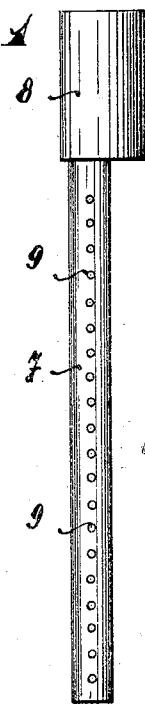
WITNESSES:
Paul Lange.
Carl Kreham
INVENTOR:
Walther Stöckigt No. 778,912. Patented January 3, 1905.

UNITED STATES PATENT OFFICE.

WALTHER STÖCKIGT, OF GREIZ, GERMANY.

DRY CELL.

SPECIFICATION forming part of Letters Patent No. 778,912, dated January 3, 1905.

Application filed May 12, 1904. Serial No. 207,578.

*To all whom it may concern:*

Be it known that I, WALTHER STÖCKIGT, electrician, a subject of the Duke of Reuss, Elder Line, and a resident of Greiz, in the Dukedom of Reuss, Elder Line, German Empire, have invented certain new and useful Improvements in Dry Cells, of which the following is a specification.

The present invention relates to dry cells, and has for its object the provision of a filling and replenishing tube for introducing the electrolyte into the cell and replenishing the same.

In the drawings, Figure 1 is a side elevation of the filling and replenishing tube. Fig. 2 is a top plan of the same. Fig. 3 is a bottom plan of the same. Fig. 4 is a part sectional view of a dry cell, showing the filling and replenishing tube in positon.

Referring to Fig. 4, 1 2 are the two electrodes, with the terminals 3 4, respectively. 5 is the filling mass, 6 the outer vessel of the cell, and 10 the cover. 7 is the filling and replenishing tube, which extends far into the porous filling mass 5. The tube is provided at its outer end with an enlargement or pouring-head 8 for facilitating the filling operation. The tube 7 is, moreover, provided with a large number of perforations 9, distributed along its length.

By means of a filling and replenishing tube arranged according to the present invention on filling the cell the electrolyte is enabled to pass quickly into the porous filling mass and to wet the same uniformly.

Having now particularly described and ascertained the nature of my said invention and in what manner the same is to be performed, I declare that what I claim is—

In a dry cell the combination of two electrodes 1, 2, a porous filling mass 5, an electrolyte, and a filling and replenishing tube provided with an eccentric cylindric pouring-head 8 and perforations 9, said filling-tube extending far into the filling mass, but ending at a considerable distance from the bottom of the cell, and being arranged between the two electrodes, substantially as and for the purpose described.

In witness whereof I have hereunto signed my name, this 23d day of April, 1904, in the presence of two subscribing witnesses.

WALTHER STÖCKIGT.

Witnesses:
FRITZ EUGEN NEUBERT,
FRIEDRICH ERNST HEROLD.